April 18, 1944.  E. N. OGLE  2,346,936
ROTARY STEAM ENGINE
Filed April 24, 1941   5 Sheets-Sheet 5
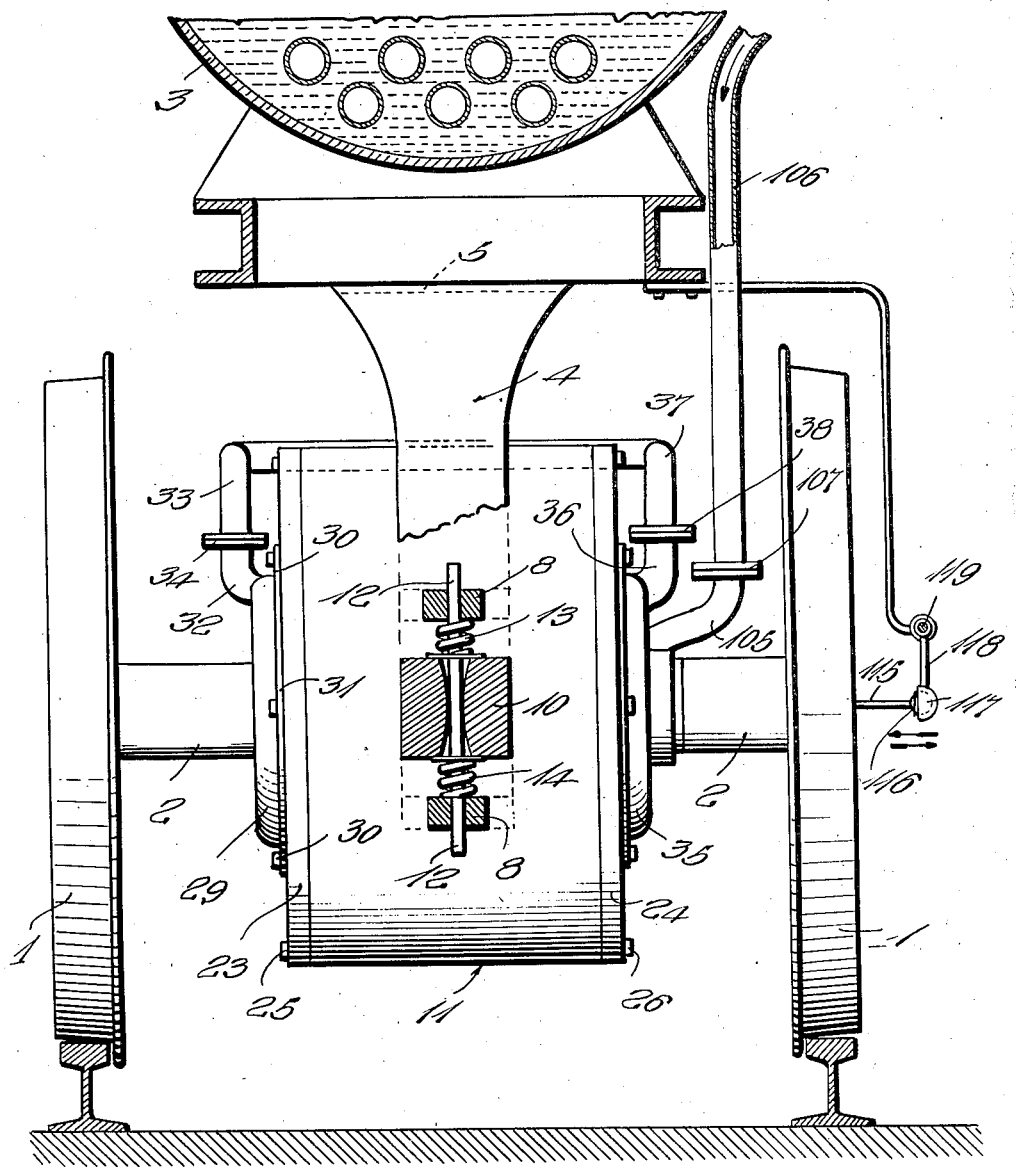
INVENTOR.
Earl N. Ogle
BY
Lacey & Lacey,
Attorneys Patented Apr. 18, 1944

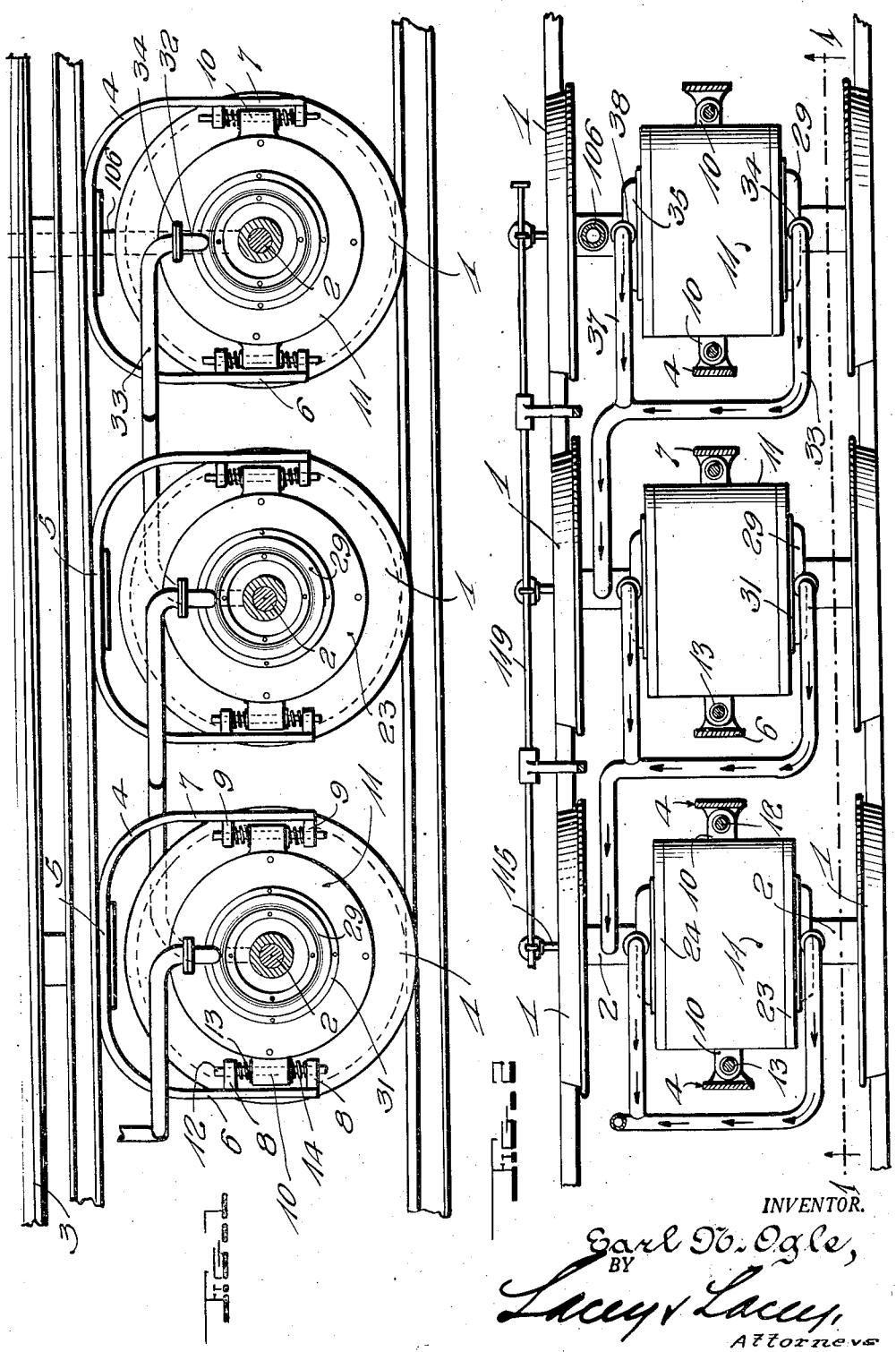

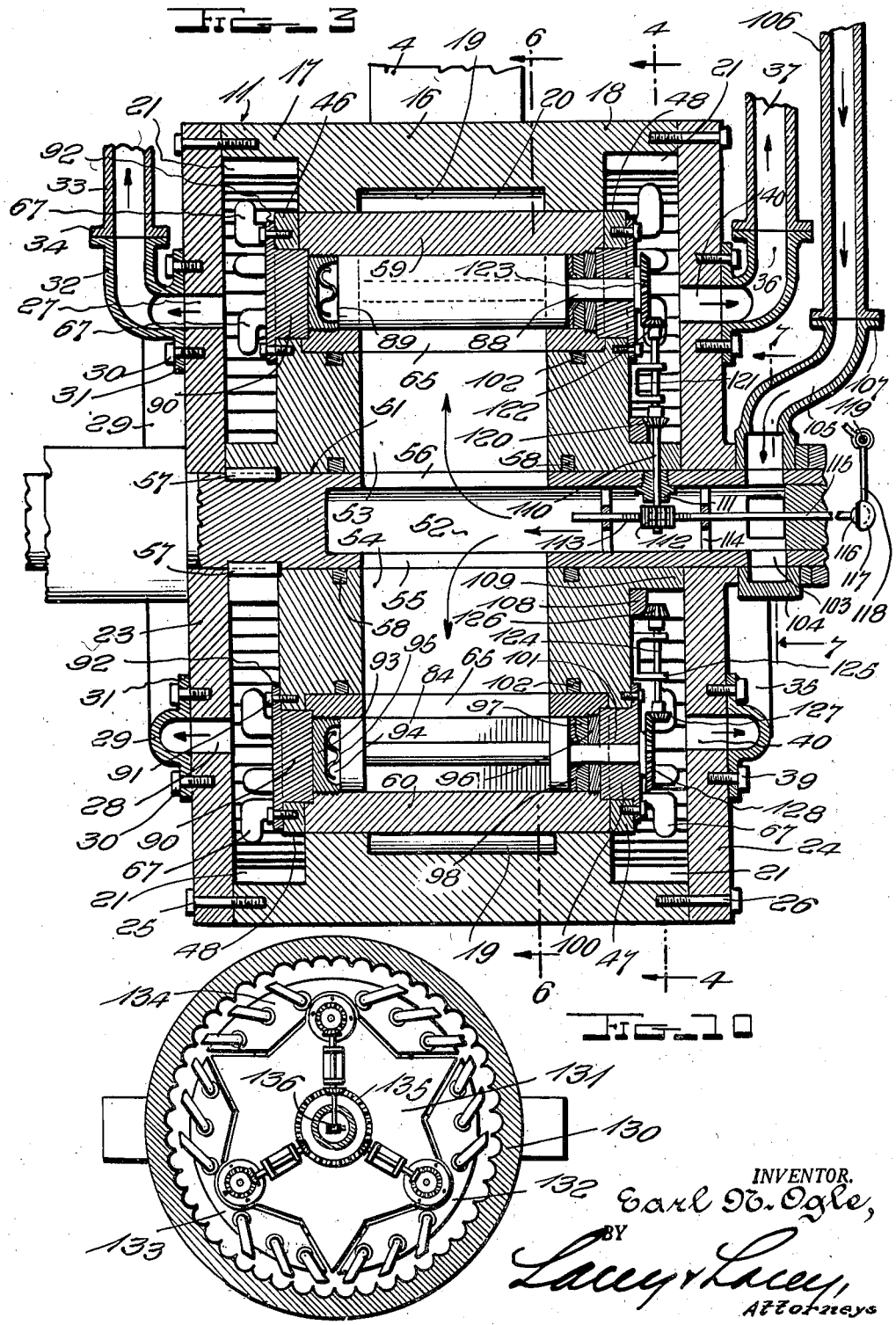

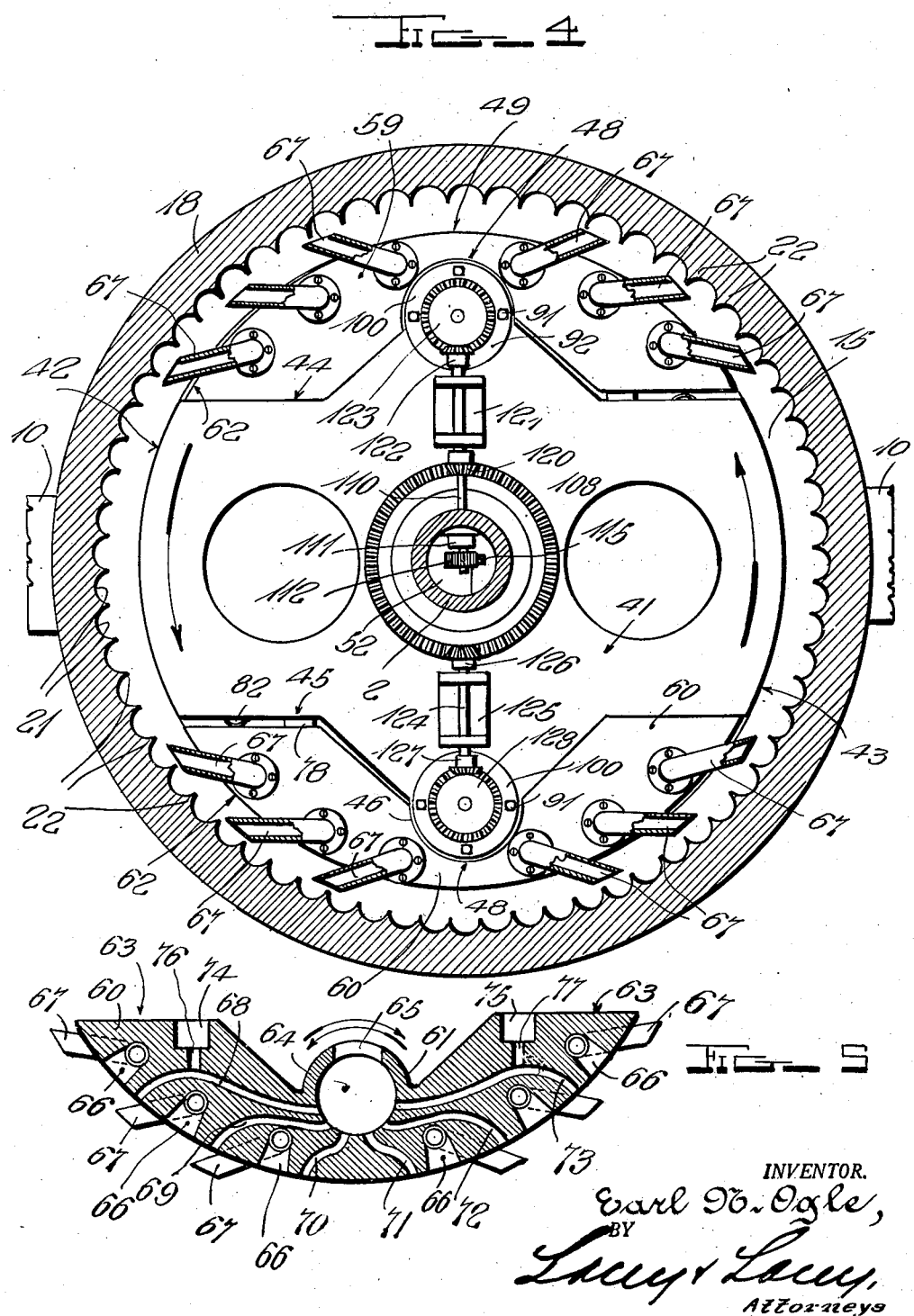

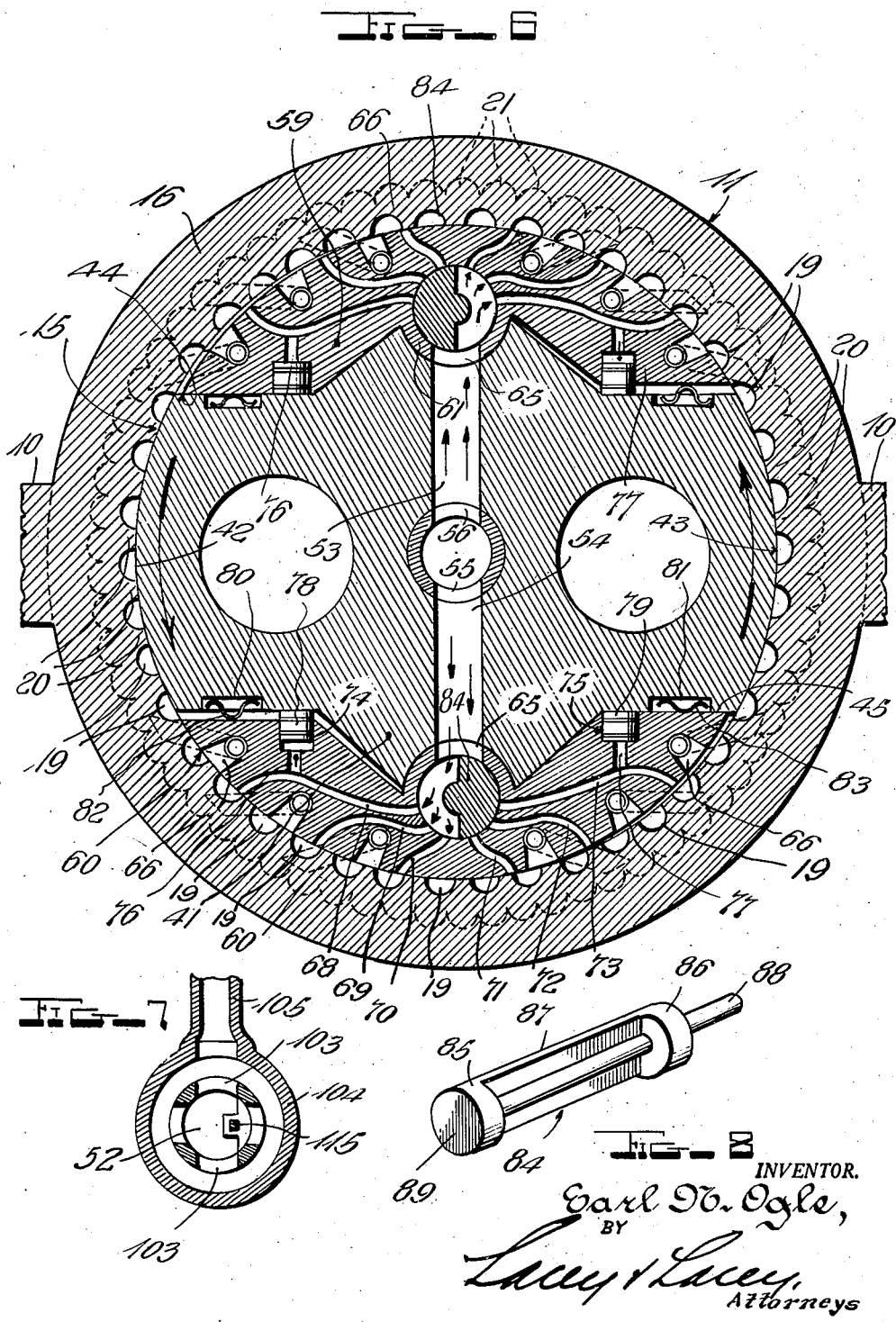

2,346,936

UNITED STATES PATENT OFFICE 2,346,936

ROTARY STEAM ENGINE

Earl N. Ogle, Bozeman, Mont.

Application April 24, 1941, Serial No. 390,173

7 Claims. (Cl. 253—87)

This invention relates to engines and more particularly to an improved rotary steam engine.

One object of the invention is to provide a rotary steam engine which will be highly efficient when used in railroad service but which will also lend itself readily for use in any application requiring motive power.

Another object of the invention is to provide a machine of this character which may be used as a water turbine for generating power.

Another object of the invention is to provide an engine of the class described which may also be used as a transmission for vehicles.

Still another object of the invention is to provide a rotary steam engine which will employ but few working parts, with the result that efficiency in operation and simplicity in construction will be assured.

A further object of the invention is to provide a rotary steam engine employing improved reversing mechanism which will permit rotation of the rotor employed in either direction with equal efficiency.

A still further object of the invention is to provide a rotary steam engine which will be far superior in efficiency than the well-known reciprocating type steam engines.

As another object, the invention seeks to provide a rotary steam engine in the operation of which steam is caused to cooperate with a plurality of impellers with the result that maximum efficiency from the steam will be assured.

A further object of the invention is to provide a rotary steam engine having improved exhaust means which will assure proper exhaust of used steam without back pressure.

A still further object of the invention is to provide a device of this character wherein means is employed for preventing sticking of the rotor due to expansion and contraction at high temperatures.

And another object of the invention is to provide a rotary steam engine which will lend itself readily for use in a system of rotary steam engines in which system the exhaust of one engine will be led to the intake of a second engine and the exhaust of a second engine will be led to the intake of a third engine, etc., for obtaining a compounding effect, whereby steam is used in more than one engine before exhausting to the atmosphere through a stack.

Another object of the invention is to provide a rotary steam engine employing means for varying the amount of steam discharged to the stator vanes or impellers employed so that the amount of power developed by the engine may be varied to suit particular conditions.

And a further object of the invention is to provide an engine of this type which will be compact so that it may be readily mounted beneath a locomotive boiler.

Another object of the invention is to provide an engine of the character described wherein improved means is employed for mounting said engine beneath the boiler of a railroad locomotive.

Further objects of the invention will become apparent during the course of the following description.

In the drawings forming a part of my application—

Figure 1 is a detail vertical sectional view on the line 1—1 of Figure 2,

Figure 2 is a detail top plan view showing a plurality of my improved steam engines as they would appear mounted in tandem, and in compound, on a railroad locomotive, Figure 3 is an enlarged vertical sectional view of my improved steam engine, Figure 4 is a vertical sectional view on the line 4—4 of Figure 3, Figure 5 is a detail sectional view showing one of the shoes employed, Figure 6 is a vertical sectional view on the line 6—6 of Figure 3 looking in the direction indicated by the arrows, Figure 7 is a detail vertical sectional view on the line 7—7 of Figure 3, Figure 8 is a detail perspective view of one of the valves employed, Figure 9 is an enlarged vertical sectional view, partly in elevation, showing the method of mounting one of the engines on a locomotive, and Figure 10 is a vertical sectional view, partly in elevation and on a reduced scale, showing a slightly modified embodiment of the invention.

In the drawings similar numerals of reference designate like parts throughout the views.

Referring now to the drawings in more detail, the numeral 1 indicates a flanged locomotive drive wheel and 2 the axle thereof. At 3 is shown the lower end portion of the locomotive boiler. In this connection, it should be understood that, while I have shown my engine as applied to a railway locomotive, it may be used effectively in marine service, as a stationary engine, or in any other service requiring dependable motive power.

In order to operatively connect the engine to the boiler, I provide an inverted U-shaped mounting bracket 4 which is provided with a flat bight portion 5 and straight parallel arms 6 and 7. Mounted on the inner surfaces of the arms 6 and 7, near their corresponding lower end portions, are pairs of vertically spaced mounting lugs 8 and 9, said lugs defining mounting yokes. The mounting yokes cooperate with mounting ears or projections 10 which extend radially from diametrically opposed points on the stator of my engine, said stator being shown generally by the numeral 11. Extending through the ears 10 and through the cooperating lugs 8 are connecting pins 12. Springs 13 and 14 are mounted about the pins 12 at each side of the lugs 10 and cooperate with the pins for resiliently connecting the engine with the bracket 4 and, of course, with the boiler 3.

The construction of the stator 11 will now be described in more detail. The stator construction is best seen in Figures 3, 4 and 6 of the drawings. By referring first to Figure 3, it will be seen that the stator is formed of heavy cast metal and is, of course, of circular contour. Said stator is recessed throughout its interior to define a circular rotor chamber 15. As best seen in Figure 3, the stator is formed with a thickened circumferentially extending center portion 16 and reduced circumferentially extending end portions 17 and 18. The center portion 16 is formed with circumferentially spaced recesses 19 which define similarly spaced vanes 20, the purpose for which will be made clear hereinafter. As will be seen in Figure 3, the recesses 19 and vanes 20 extend throughout the major portion of the width of said thickened portion 16. The reduced end portions are each formed with circumferentially extending recesses 21 which cooperate to define vanes or blades 22. As will be seen clearly in Figure 3, the recesses 21 and the blades 22 extend laterally throughout the entire width of the said reduced end portions.

In order to close opposite ends of the stator 11, for closing the rotor chamber 15, I provide end walls 23 and 24, said end walls being preferably of circular shape and being held in place on the stator by means of bolts 25 and 26 which extend through said end walls and into the reduced end portions 17 and 18 respectively. Mounted on the wall 23 and communicating with the interior of the chamber 15 through openings 27 and 28 is an exhaust manifold 29, said manifold being of circular shape and being of inverted U-shape in cross section. The manifold 29 is held in place on the wall 23 by means of bolts 30 which extend through flanges 31 on said manifold. Formed integrally with the manifold and extending outwardly and upwardly therefrom is an exhaust neck 32. The exhaust neck 32 is connected with an exhaust pipe 33 by means of a mating flange coupling 34. An exhaust manifold 35, which is identical in construction to the manifold 29, is mounted on the wall 24. An exhaust neck 36, similar to the neck 32, is connected with an exhaust pipe 37 by means of a flanged coupling 38. The manifold 35 is connected with the end wall 24 by bolts 39, and said manifold communicates with the interior of the chamber 15 through openings 40. As best seen in Figure 2 of the drawings, the pipes 33 and 37 are connected with each other and with the intake of the next succeeding engine so that the exhaust steam will be led from the exhaust manifolds to said next succeeding engine.

Rotatively mounted within the chamber 15 of the stator 11 is a rotor 41. The rotor 41 is of polygonal shape and includes arcuate opposite end walls 42 and 43 and top and bottom walls 44 and 45. The top and bottom walls, as best seen in Figure 3, are cut away at their mid-portions to define pairs of ears 46 and 47 which pairs of ears, in turn, define mounting yokes 48.

It should be understood that the metal employed for making the rotor and stator of my improved engine will be of any suitable composition. It is thought an alloy of nickel, steel and brass will lend itself particularly well for the purpose and that brass or bronze may also be used for making certain parts inasmuch as these metals are wear resistent when subjected to frictional contact.

The rotor of my improved engine is, of course, mounted for free rotation within the chamber 15. In order to assure that said rotor will rotate properly within the chamber 15 under all conditions, I have deemed it necessary to form the shoes to be described hereinafter separately from the rotor to allow for expansion due to the high operating temperatures dealt with when working with live steam. In other words, if the rotor 41 were made of one piece construction, the high temperature generated by the steam discharging therethrough would cause expansion of the metal and consequent sticking of said rotor in the chamber 15.

The rotor 41 is formed with an axial opening 51 which receives the axle 2 therethrough. The axle, as best seen in Figure 3, is formed with an axial opening 52 and said axial opening communicates with discharge ports 53 and 54 in the rotor body through openings 55 and 56. In order that the rotor 41 may be locked to rotate with the axle 2, keys 57 are employed, said keys being disposed between the body of the rotor and the axle 2. Steam packing 58 is fitted between the axle and the rotor for preventing escape of steam from between these elements.

Operatively mounted on the rotor 41 are shoes 59 and 60 which are of identical construction so that a description of one will suffice for both. The construction of the shoe 60 is typical and will be described in more detail hereinafter. Said shoe is of substantially arcuate, or crescent shape and includes a central portion 61 and an arcuate outer surface 62. The shoe 60 includes an inner wall 63 which is flat at its end portions which has mid-portions inclined toward the central portion 61. The shoe 60 is normally hingedly mounted between the ears 47 of the rotor in a manner to be explained in more detail hereinafter.

As best seen in Figure 5, the central portion of the shoe 60 is formed with a cylindrical valve opening 64, said valve opening having a passage 65 leading therefrom and communicating with the inlet passage 54. Formed in the arcuate outer surface 62 of the shoe 60 are spaced exhaust ports 66, said ports being substantially rectangular in shape and being capable of alining with the recesses 19 which define the baffles 20. As will be seen, three of the exhaust ports are arranged at each side of the central portion 61. The openings 66 extend throughout the major portion of the width of the shoe, and communicating with each of the openings at their opposite ends are exhaust pipes 67. As will be seen, the exhaust pipes extend at opposite sides of the shoe and are directed toward the vanes 22 on the reduced end portions 17 and 18. As best seen in Figures 4 and 5, three of the exhaust pipes 67 at one end portion of the shoe extend substantially tangentially in one direction while the remaining three pipes at the opposite end portion of the shoe extend substantially tangentially in the opposite direction. Communicating between the arcuate surface of the shoe, between the exhaust ports, and the valve opening 64 are discharge passages 68, 69 and 70, which extend substantially tangentially with respect to the rotor through one end portion of the arcuate surface of the shoe. Similar discharge passages 71, 72 and 73 communicate between the arcuate opposite end surface of the shoe and the opening 64. It is to be noted that the corresponding inner ends of the passages 71, 72 and 73 are disposed at substantially opposite sides of the openings 64 from the inner ends of the passages 68, 69 and 70. The purpose for the particular arrangement of the exhaust ports and discharge passages will be made apparent when the description of the operation of the invention is set forth.

Formed in the flat portions of the wall 63 at their corresponding inner ends are cylinders 74 and 75, and communicating between the cylinders 74 and 75 and the passages 68 and 73 respectively are steam passages 76 and 77. As best seen in Figure 6, the cylinders 74 and 75 have pistons 78 and 79 mounted therein, said pistons having their corresponding outer end surfaces bearing against the wall 45 of the rotor 41. Formed in the wall 45 near its corresponding opposite ends are recesses 80 and 81 and mounted in the recesses are leaf springs 82 and 83, said leaf springs being bowed outwardly and having their outwardly bowed portions normally engaging the flat portions of the wall 63.

In order to distribute the steam to flow through the desired discharge passages, I provide a rotary valve which is indicated generally at 84. The valve 84 is shown in perspective in Figure 8 of the drawings and, by referring to this view, it will be seen that said valve includes heads 85 and 86 which are connected by means of an integral web 87 which is of substantially semi-cylindrical shape. The valve 84 also includes an integral stem 88 which extends axially from one end thereof. The opposite end of the valve, which carries the head 85, is formed with a flat surface 89. The valve 84 is normally rotatably mounted within the valve opening 64. In order to retain said valve rotatably mounted as described, I employ the following structure. A cap 90 is mounted in the ear 47 of the rotor and is held in place in said ear by means of screws 91 which extend through flanges 92 on said cap and into the end wall of the rotor. Mounted between the inner surface of the cap 90 and the wall 89 is a plug 93 which plug is preferably screwed into place and which is formed with a recess 94 in which is mounted a bowed leaf spring 95, said spring bearing against the wall 89 and limiting said valve 84 against longitudinal displacement toward the wall 23. At the opposite side of the rotor plugs 96 and 97, packing 98 surrounds the stem 88 of the valve within the opening 64. Overlying the plug 96 is a cap 100 which is similar to the cap 90 but which is formed with an axial opening 101 through which extends the stem 88. The cap 100 is held in place on the opposite ear 47 in a manner similar to that employed for retaining the cap 90 in place. It will be seen that, when the caps 90 and 100 are in place, the valve 84 will be rotatably mounted within the opening 64 of the shoe 60 but will be limited against endwise displacement from said shoe.

In order to prevent leakage of steam from the passages 53 and 54 between the rotor and the shoes, I provide packings 102.

As stated hereinbefore, the axle 2 is formed with a passage 52 which extends throughout the major portion of the length of said axle. Said passage provides means whereby steam may be introduced to the passages 53 and 54 of the rotor 41. As best seen in Figures 3 and 7, the passage 52 is formed, exteriorly of the stator, with intake ports or openings 103, and surrounding the axle 2 exteriorly of the stator and about the openings 103 is an intake manifold 104, said intake manifold being formed with an inlet neck 105 to which is connected an intake pipe 106. A flanged coupling 107 is employed for connecting the neck 105 with said pipe 106. It will now be understood that steam entering the pipe 106 will pass into the intake manifold, through the ports 103, through the passage 52, through the discharge ports 55 and 56 and into the passages 53 and 54. Steam will, of course, enter the valve openings or chambers 64 and will be distributed by the valves 84 therein to pass out through certain of the discharge passages.

The valves 84, which are mounted in the chambers or openings 64, are rotatably adjusted from a point exteriorly of the engine by mechanism which includes a ring gear 108 which is rotatably mounted on a hub 109 which is formed integrally with the rotor. In order to impart rotative movement to the ring gear 108, I provide a stem 110 which extends radially through the hub 109 and through a bushing 111 in the wall of the axle 2. Carried on the lower end of the stem 110 is a pinion 112 and the teeth of said pinion mesh with the teeth of a rack 113 which extends within the passage 52 and is slidably supported by means of spaced guide webs 114. The rack 113 is extended to define an operating rod 115 on the outer end of which is mounted a ball 116. Operatively connected with the ball is a socket member 117 to which is connected an actuating lever 118. The actuating lever has its end connected with operating mechanism which, as best seen in Figures 2 and 9, is indicated at 119.

The stem 110 carries a beveled gear 120 which meshes with the ring gear 108 so that, when rotative movement is imparted to the stem 110, such rotative movement will be imparted to the ring gear. The stem 110 is extended upwardly through a guide bracket 121, which is mounted on the outer surface of the rotor 41, and carries a beveled pinion 122 at its upper end. The pinion 122 meshes with a beveled gear 123 which is fixed to the outer end portion of the stem 88. It will now be further understood that, when the stem 110 is rotated, rotative movement will be imparted to the gear 123 for rotating the valve 84 within the chamber or opening 64. Such rotative movement is caused by reciprocating the rack 113 longitudinally within the passage 52. The valve operating mechanism as described up to the present makes provision for operating but one valve. In order to operate the valve on the other shoe, additional mechanism is required. This mechanism includes a stem 124 which is supported on the end wall of the rotor by a guide bracket 125. The stem 124 carries a beveled pinion 126 which meshes with the ring gear 108 and, at its lower end, the stem carries a beveled pinion 127 which meshes with a beveled gear 128 on the stem 88 of the valve 84 in the other of the shoes. It will now be understood that, when the first-mentioned valve is being rotatably adjusted, said rotatable adjusting motion will be transmitted to the valve of the other of the shoes through the valve stem 124, the pinions 126 and 127 and the beveled gear 128.

It is thought that the operation of my invention may be understood from the foregoing description. However, a brief statement of operation is not thought to be out of place. As stated, the engine is fed by steam from the boiler 3 of the locomotive. Said steam passes through the inlet pipe 106 and into the passage 52 through the intake manifold 104. From that point, the steam flows through the passages 53 and 54 and into the chambers or openings 64. When the valves 84 in the shoes 59 and 60 are in the position shiwn in Figure 6, steam will pass through the passages 68, 69 and 70 and will discharge from the open ends of said passages against the vanes 20 defined by the openings 19. The result of this will be that the rotor will be caused to rotate within the stator. As will be observed, when the open ends of the discharge passages 68, 69 and 70 are in alinement with the ends 20, the exhaust ports 66 will be out of alinement with the openings defining said alined vanes. Accordingly, steam will be confined in the openings 19 until the rotor has moved sufficiently to aline said steam filled openings with certain of the axhaust ports. When the openings 19 containing the steam are alined with the exhaust ports, said steam will exhaust through said exhaust ports at each side thereof and through the exhaust pipes 67. From said exhaust pipes the steam will flow against the baffles or vanes 22 with the result that additional impetus will be imparted to the rotor. In other words, the steam passing from any one of the exhaust ports will be used twice, with the result that maximum power will be obtained from a given amount of steam. Inasmuch as the passages 68, 69 and 70 in the shoe 60, and the corresponding passages in the shoe 59, are arranged substantially tangentially, full effect of the steam under pressure will be assured.

Should it be desired to reduce the power output of the engine, it is only necessary to rotate the valves for closing off either or both of the passages 69 and 70 in the shoe 60, and the corresponding passages in the shoe 59. When this is done, steam will be permitted to discharge through the passage 68 only. It is thought that maximum power, such as would be obtained by retaining all of the passages open, will be needed only when starting a load. After the load has been placed in motion, one or more of the steam passages may be shut off for reducing the power and, of course, the amount of steam used. After the steam has been exhausted against the vanes 22, it will pass through the openings 40 in the end walls 23 and 24 of the stator and into the exhaust manifolds 29 and 35. From the exhaust manifolds the steam will pass through the pipes 33 and 37 to the intake pipe of the next engine or to the stack of the locomotive or other engine.

Should it be desired to reverse the direction of movement of the rotor, it is only necessary to rotate the valves 84 within the shoes 59 and 60 when the passages 68, 69 and 70 will be closed and the passages 71, 72 and 73 exposed. When this is done, steam will pass from the discharge passages 71, 72 and 73 at the opposite end portions of the arcuate surfaces of the shoes and, subsequently, through the exhaust pipes connected with the exhaust ports disposed between said discharge passages. The engine will, of course, rotate with equal efficiency in either direction.

Attention is particularly called to the fact that the rotor shoes are hingedly connected between the ears 46. The reason for this mounting is to allow a slight amount of play between the shoes and the rotor proper to allow for expansion and contraction. In other words, as stated hereinbefore, if the shoes were made integral with the rotor, expansion, caused by extreme heat, would cause the rotor to stick within the stator. The slight amount of play prevents such sticking.

When the engine is in operation, a portion of the steam passing through the discharge passage 68 of the shoe 60 and the corresponding passage in the shoe 59 will enter the cylinder 74 and will urge the piston 78 therein against the wall 45 of the rotor with the result that the shoe will be urged toward the stator of said shoe. The springs 82 and 83 will tend to urge the rotor shoes toward the stator when the engine is not in operation.

It is desired to call particular attention to the fact that the valves may be quickly and efficiently adjusted, either for partially controlling the power generated by the engine or for reversing the direction of rotation of the rotor thereof, by simply moving the rack within the passage 52. In view of the fact that two exhaust manifolds are employed, one on each side of the stator, there will be no danger of back pressure of exhaust steam within the engine. Full efficiency from the steam will thus be assured.

The engine described hereinbefore makes use of but two rotor shoes. It should be understood, however, that engines employing three or more shoes may be constructed. In Figure 10 of the drawings, I have shown an engine wherein the rotor employed makes use of three shoes. In this view, the numeral 130 indicates the stator of this embodiment of the invention, said stator being of a construction identical with that of the stator 11 of the preferred form of the invention. Mounted within the stator is a rotor 131 and mounted on the rotor are three shoes 132, 133 and 134, said shoes being identical in construction with the shoes 59 and 60. A ring gear 135 is mounted on the end wall of the rotor 131 and is operated by rack and pinion mechanism 136 similar to that of the preferred form. This embodiment of the invention differs from the preferred modification only in the disclosure of more than two shoes for the rotor. It is obvious that, if an engine were made large enough, even more than three shoes could be employed.

While my invention lends itself particularly well for use as a steam engine, it should be understood that, if desired, the invention may be adapted for use as a fluid transmission for motor vehicles. If the invention were adapted for this purpose, it is obvious that oil would be used in place of steam. Moreover, the invention is also readily adapted for use as a water turbine for connection with an electric generator.

My engine requires no side rods, reciprocating valve mechanisms or other cumbersome working parts which add to the wear and tear both to the engine and to the track on which it is operated. Maintenance of railway locomotives or other steam operated equipment will be reduced to a minimum by the use of my engine.

It is also desired to call partcular attention to the fact that, inasmuch as steam discharging from the open ends of the discharge passages will be confined within the openings defining the vanes until full effect of said steam has been obtained, maximum power from the engine will be assured. In other words, discharge of the steam in the openings 19 adjacent the open ends of the discharge passages will not be possible until the rotor has moved, by the action of said steam, sufficiently to aline the exhaust ports with said openings carrying the steam. Premature escape of the steam will thus be prevented.

It is thought that the construction and operation of the invention will now be understood. Accordingly, further description is thought to be unnecessary.

Having thus described the invention, what is claimed as new is:

1. A rotary steam engine including a stator having a thickened circumferentially extending central portion formed with recesses defining vanes, said stator having reduced end portions formed with recesses defining vanes, a rotor, an axle extending through the stator and rotatably mounting the rotor within said stator, said rotor having a discharge passage disposed to selectively confront the recesses in the thickened central portion, an exhaust port formed in the rotor at one side of the discharge passage, exhaust pipes connected with the exhaust port and disposed toward the vanes in the reduced end portions, means for leading steam to the rotor, said steam passing through the discharge passage and impinging against the first-mentioned vanes for effecting rotation of the rotor, said steam exhausting through the exhaust pipes and impinging against the second-mentioned vanes for aiding rotation of the rotor upon alinement of the exhaust port with certain of the recesses, and exhaust means for leading exhaust steam from the stator.

2. A rotary steam engine as recited in claim 1 wherein the exhaust means is connected to the stator at each side thereof.

3. A rotary steam engine including a stator having a thickened circumferentially extending central portion formed with recesses defining vanes, said stator having reduced end portions formed with recesses defining vanes at each side of the thickened central portion, a rotor rotatably mounted within the stator, a shoe on the rotor and having discharge passages to selectively confront the vanes in the thickened central portion of the stator, said shoe having a valve chamber, said rotor having a passage communicating with the valve chamber, exhaust ports, exhaust pipes carried by the exhaust ports at each side thereof and having their outer end portions directed tangentially with respect to the vanes on the reduced end portions of the stator, means for conducting steam through the rotor to the valve chamber for distribution through certain of the discharge passages to impinge against the first-mentioned vanes for effecting rotation of the rotor, a valve in the valve chamber for controlling flow of steam through said discharge passages, said steam exhausting from the exhaust ports through the exhaust pipes and impinging against the second-mentioned vanes upon alinement of the first-mentioned recesses with said exhaust ports for aiding rotation of the rotor, and means for leading exhaust steam from the stator.

4. In a rotary steam engine, a stator having vanes, a rotor rotatably mounted in the stator, a shoe, a spring interposed between the shoe and the rotor and urging the shoe toward the stator, said shoe having a cylinder formed therein, a piston in the cylinder, a discharge passage formed in the shoe, a steam passage connecting the cylinder with the discharge passage, means for conducting steam under pressure to the discharge passage to impinge against the vanes for imparting rotation to the rotor within the stator, a portion of the steam entering the cylinder through the steam passage and urging the piston against the rotor whereby said shoe will be urged toward the stator, and means hingedly connecting the shoe with the rotor.

5. In a rotary steam engine, a stator having vanes, a rotor rotatably mounted in the stator and having ears defining a yoke, a shoe having a valve chamber and discharge passages communicating between the chamber and the outer surface of the shoe, certain of said discharge passages having their open outer ends at one end portion of said shoe and certain other of said passages having their open outer ends at the opposite end portion of said shoe, a valve rotatably mounted in the valve chamber, means extending through the ears and into the valve chamber and limiting the valve against displacement from the valve chamber, said means hingedly connecting the shoe with the rotor, an axle rotatably mounting the rotor within the stator and having a passage, and valve controlling means mounted within the passage and on the rotor and being rotatable for rotating the valve in the valve chamber whereby steam entering said valve chamber will be caused to discharge through certain of the discharge passages against the vanes for causing rotation of the rotor in the stator, rotation of the valve causing diversion of the steam to discharge through other of the discharge passages for causing rotation of the rotor in the opposite direction, said last-mentioned means including a rack and gearing, and means for exhausting steam from the engine at each side of the stator.

6. In a steam engine of the class described, a stator having vanes, a rotor mounted within the stator, a pair of substantially sector-shaped shoes pivotally mounted on the rotor at diametrically opposite points, said shoes having their outer surfaces disposed within the circumference of the rotor and provided with interior discharge passages, exhaust pipes carried by said shoes and discharging against the vanes, and means for leading steam through the rotor to the passages in the shoes.

7. In a rotary steam engine of the class described, a stator having vanes, a rotor mounted within the stator and formed with seats spaced from each other circumferentially of the rotor, rocking shoes extending circumferentially of the rotor and mounted in the seats of the rotor for rocking movement, said shoes being provided with discharge passages, exhaust pipes carried by the shoes and arranged in sets extending in opposite directions diagonally of the rotor for discharging against the vanes, said shoes each having a valve chamber, discharge passages communicating with the valve chambers and arranged in sets leading toward opposing ends of the shoes, means for conducting steam through the rotor to the valve chambers, a reversing valve on each of the valve chambers for controlling flow of steam through the passages and being rotatable from a position for connecting with one side of the discharge passage to a position for connecting with the other side of the discharge passage and shoe to a connection with the first side of the discharge passage whereby the direction of rotation of the rotor may be controlled, and exhaust manifolds on the stator for leading exhaust steam from said stator.

EARL N. OGLE.